(12) United States Patent
Lee

(10) Patent No.: US 8,167,329 B2
(45) Date of Patent: May 1, 2012

(54) FIFTH-WHEEL TRAILER WITH AN ADJUSTABLE FLOOR AND A METHOD FOR ITS USE

(76) Inventor: Garry Wayne Lee, Goonellabah (AU)

( * ) Notice: Subject to any disclaimer, the term of this patent is extended or adjusted under 35 U.S.C. 154(b) by 39 days.

(21) Appl. No.: 12/869,349

(22) Filed: Aug. 26, 2010

(65) Prior Publication Data

US 2012/0049486 A1    Mar. 1, 2012

(51) Int. Cl.
*B62D 53/06*    (2006.01)
(52) U.S. Cl. .................. 280/423.1; 280/789; 296/168
(58) Field of Classification Search ............... 280/423.1, 280/433, 434, 438.1, 467, 468, 490.1, 406.2, 280/412, 430, 789, 425.2, 441.2; 296/175, 296/168
See application file for complete search history.

(56) References Cited

U.S. PATENT DOCUMENTS

| | | | |
|---|---|---|---|
| 2,835,502 A * | 5/1958 | Willetts | 280/43.22 |
| 2,855,240 A | 10/1958 | Toland | |
| 3,240,506 A * | 3/1966 | McMullen | 280/43.23 |
| 3,770,297 A | 11/1973 | Quick | |
| 3,871,700 A | 3/1975 | Brownlee | |
| 4,085,959 A | 4/1978 | Dimick | |
| 4,943,204 A * | 7/1990 | Ehrlich | 414/495 |
| 5,092,650 A | 3/1992 | Perlot | |
| 5,328,320 A * | 7/1994 | Farrow et al. | 414/495 |
| 5,374,094 A | 12/1994 | Smith et al. | |
| 5,620,224 A | 4/1997 | Dibiagio et al. | |
| 5,934,738 A | 8/1999 | Welles | |
| 5,984,396 A | 11/1999 | Schneider | |
| 6,199,894 B1 * | 3/2001 | Anderson | 280/638 |
| 6,283,040 B1 * | 9/2001 | Lewin | 105/404 |
| 6,648,391 B1 * | 11/2003 | Whiteford et al. | 296/26.08 |
| 6,857,643 B2 * | 2/2005 | Neider | 280/43.18 |
| 6,896,307 B2 | 5/2005 | Nye et al. | |
| 7,665,788 B2 * | 2/2010 | Dibdin et al. | 296/25 |
| 7,665,952 B2 * | 2/2010 | Schmidt | 414/812 |
| 7,930,857 B2 * | 4/2011 | Pope | 52/67 |
| 2004/0174031 A1 * | 9/2004 | Rasmussen | 296/26.01 |
| 2011/0175397 A1 * | 7/2011 | Amrine et al. | 296/184.1 |

* cited by examiner

*Primary Examiner* — Tashiana Adams
(74) *Attorney, Agent, or Firm* — Muskin & Cusick, LLC; Shawn R. Farmer; Jon H. Muskin

(57) ABSTRACT

A fifth-wheel trailer having a forward section comprising an adjustable-height floor. The floor being capable of moving up to a raised position to provide sufficient clearance for a towing vehicle to attach to the trailer for towing. The floor also being capable of moving down to a lowered position to provide a trailer with an approximately even floor and a full-height ceiling throughout. The present adjustable-height floor does not interfere with the structural stability of the trailer's main frame including its pin box.

20 Claims, 9 Drawing Sheets

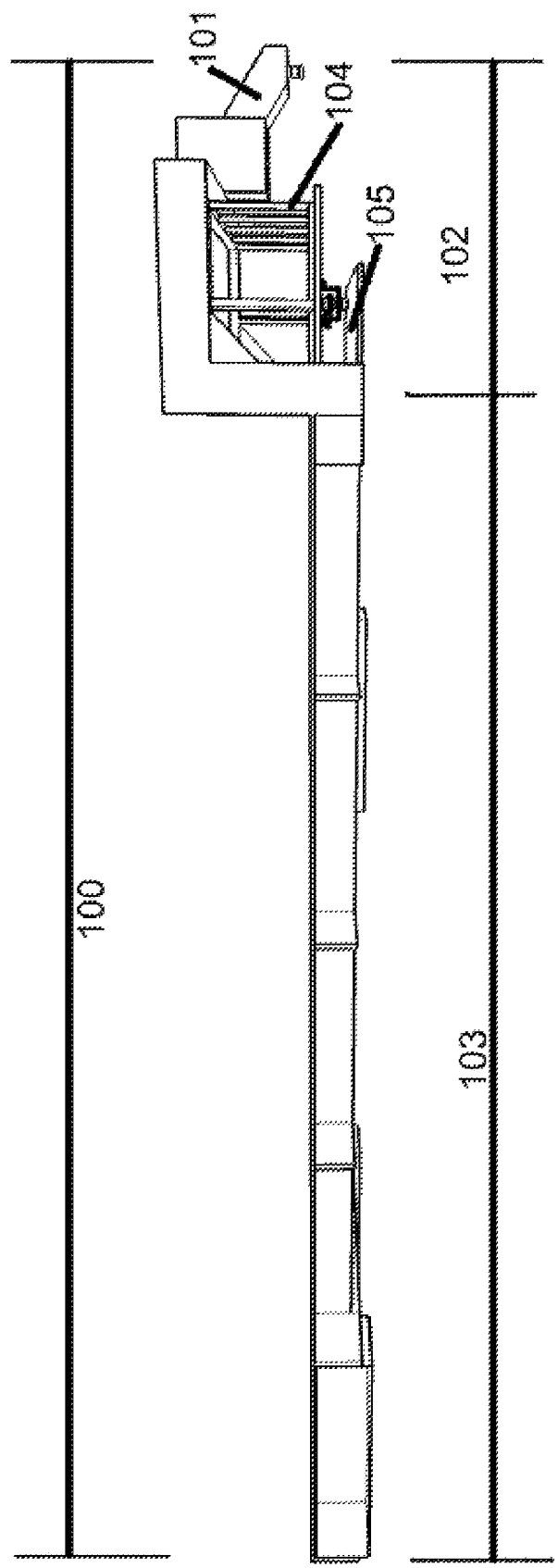
FIG. 1/9

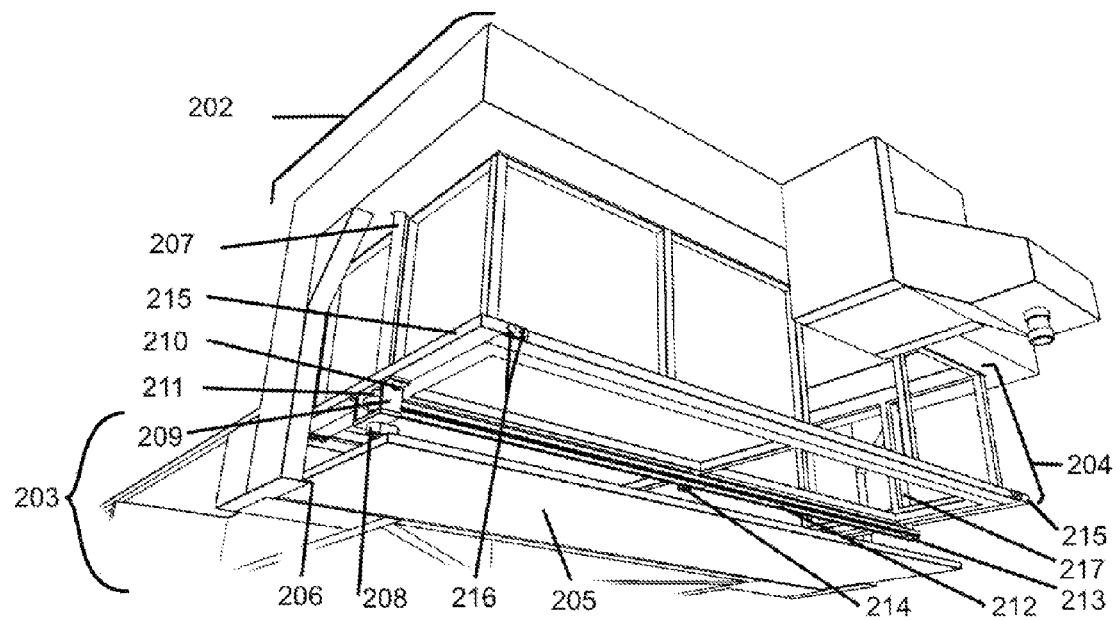
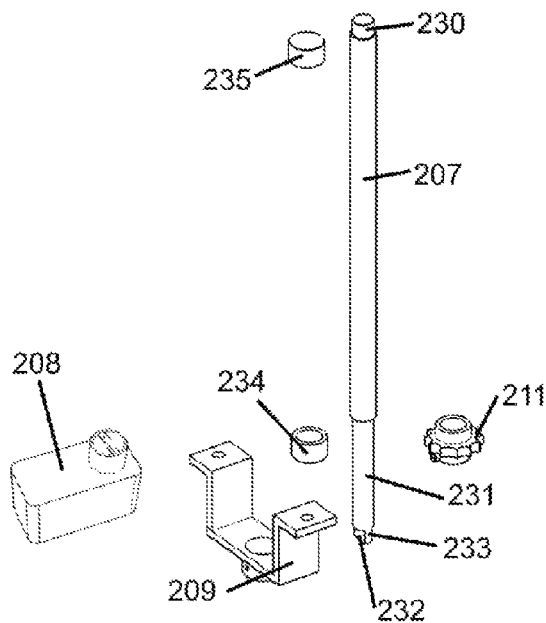
FIG. 2/9

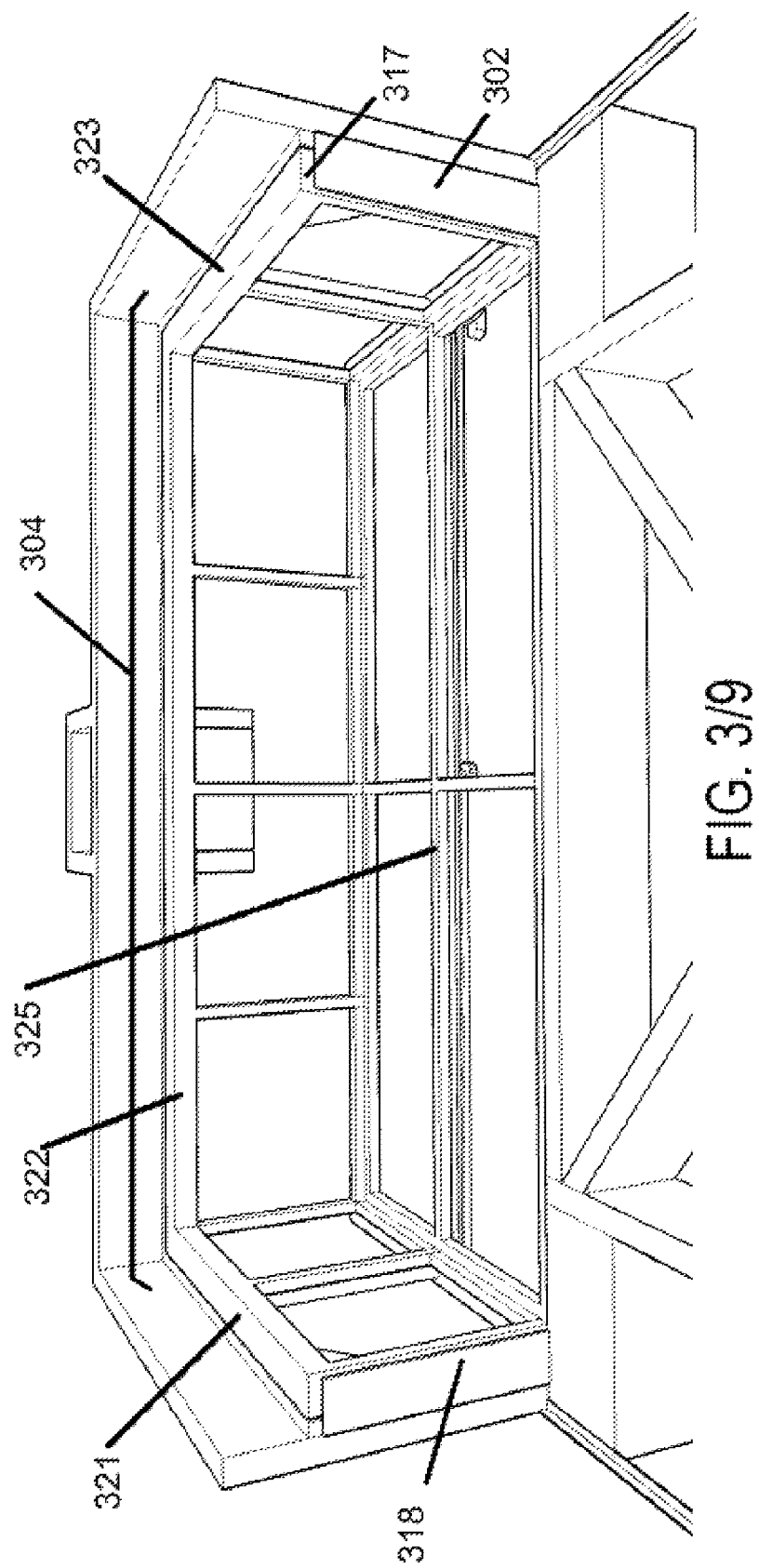

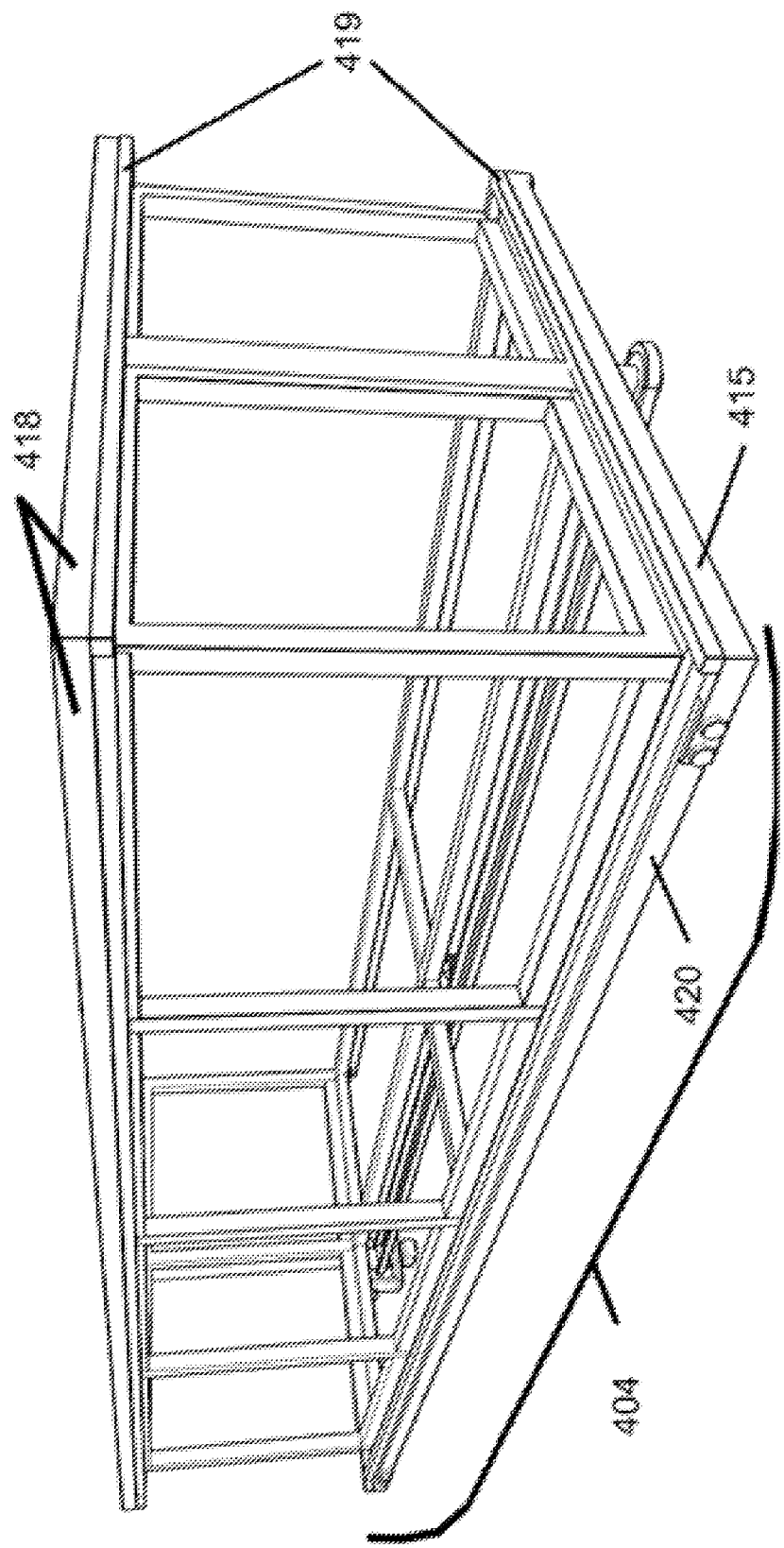
FIG. 4/9

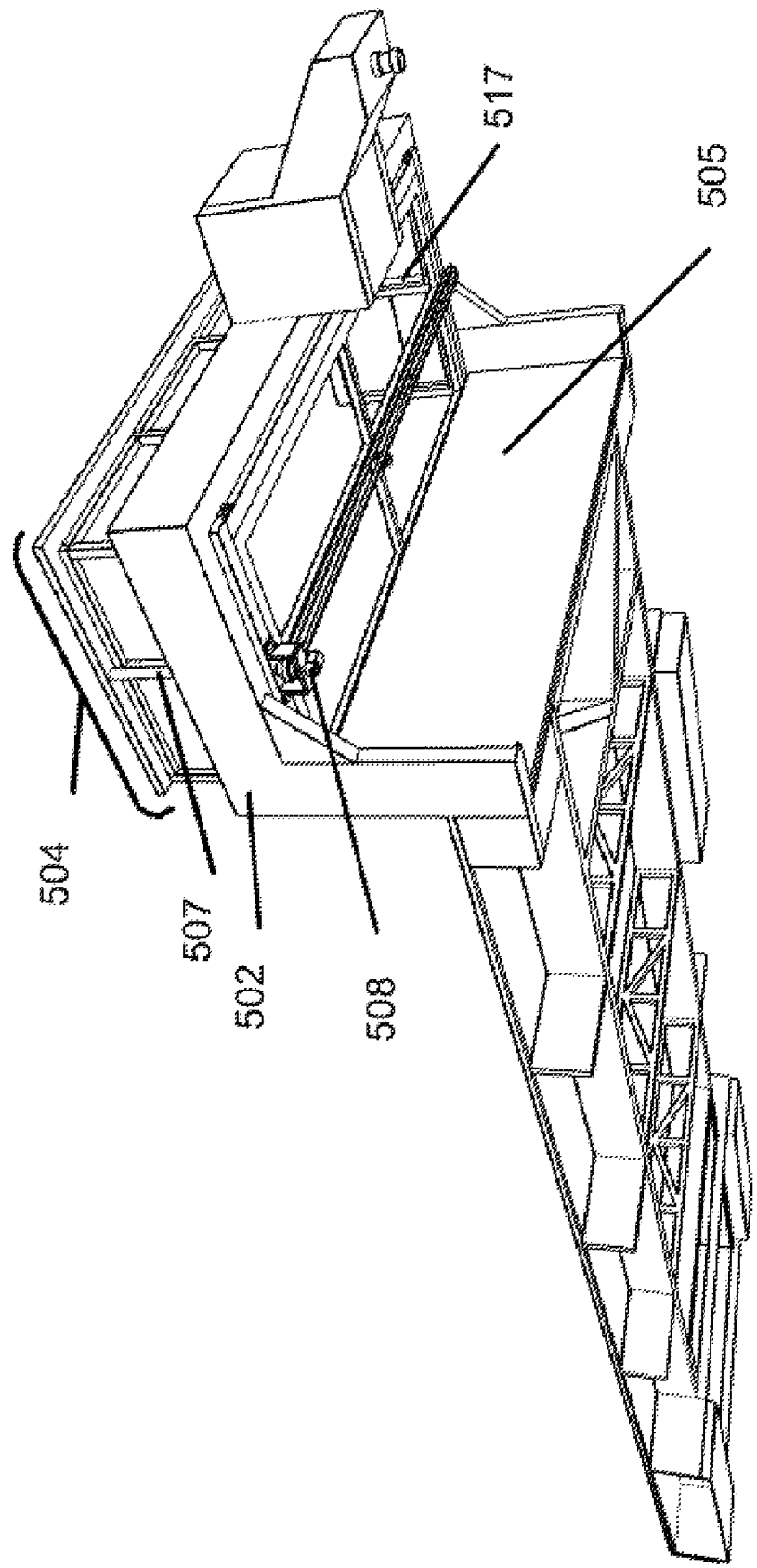
FIG. 5/9

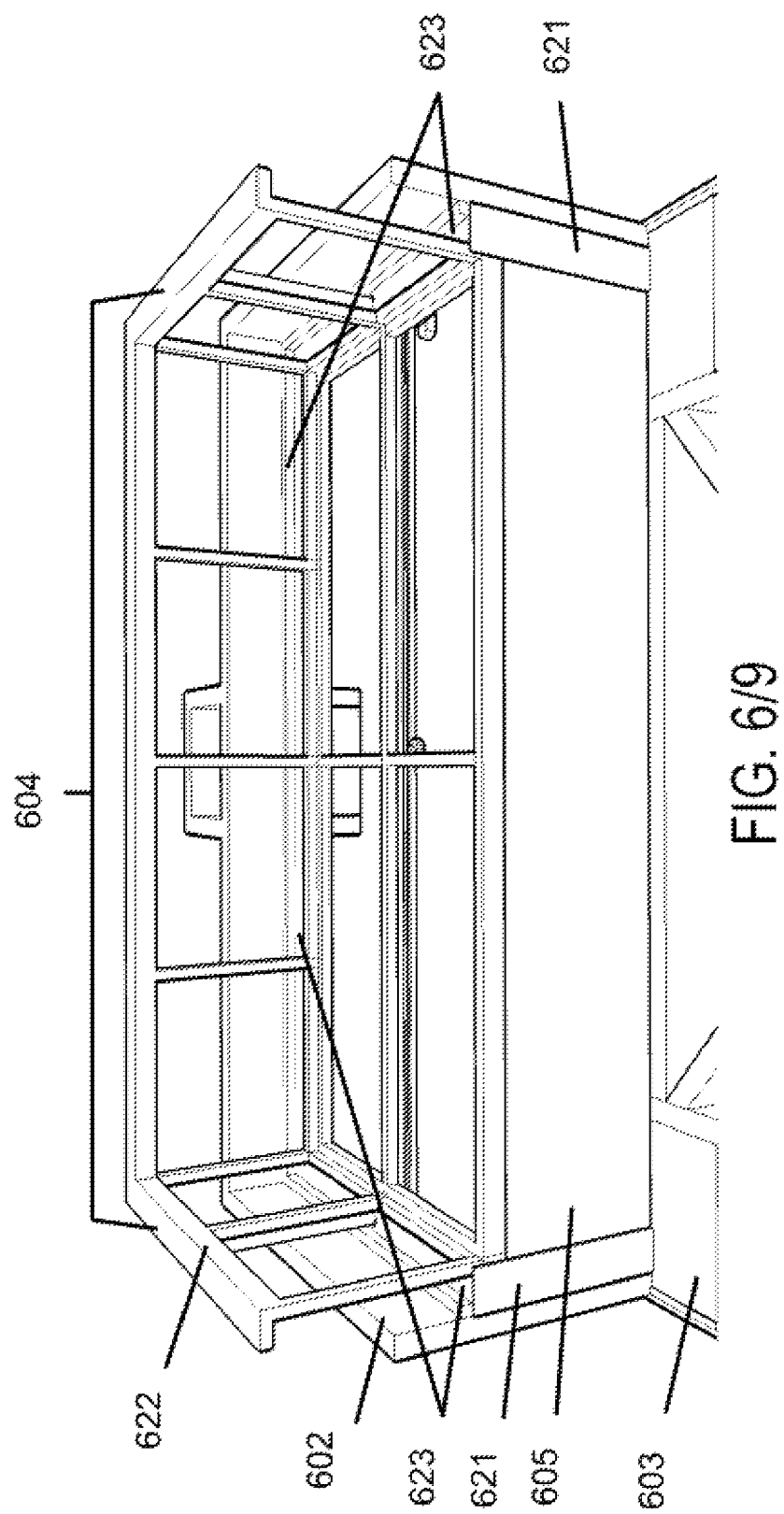
FIG. 6/9

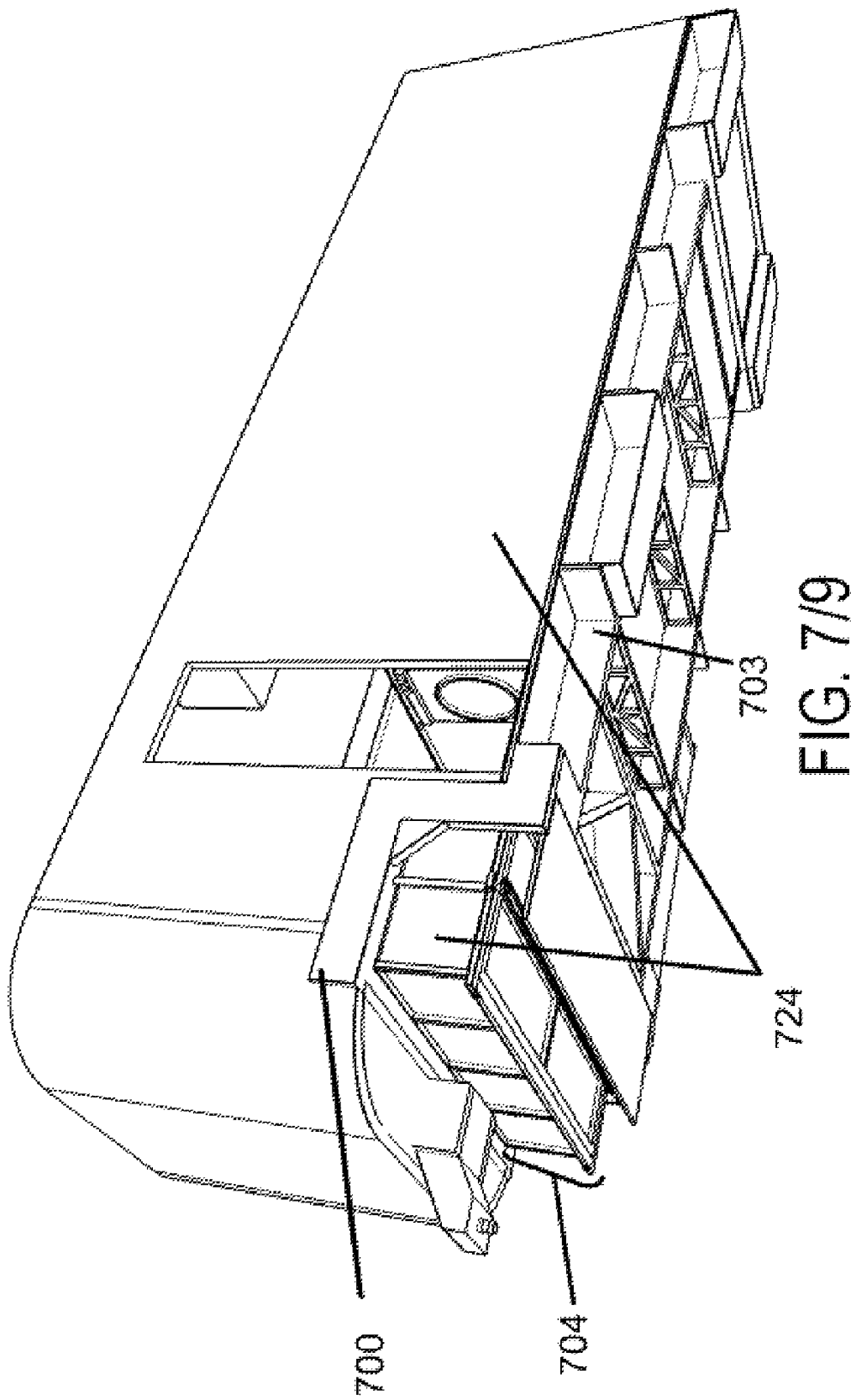

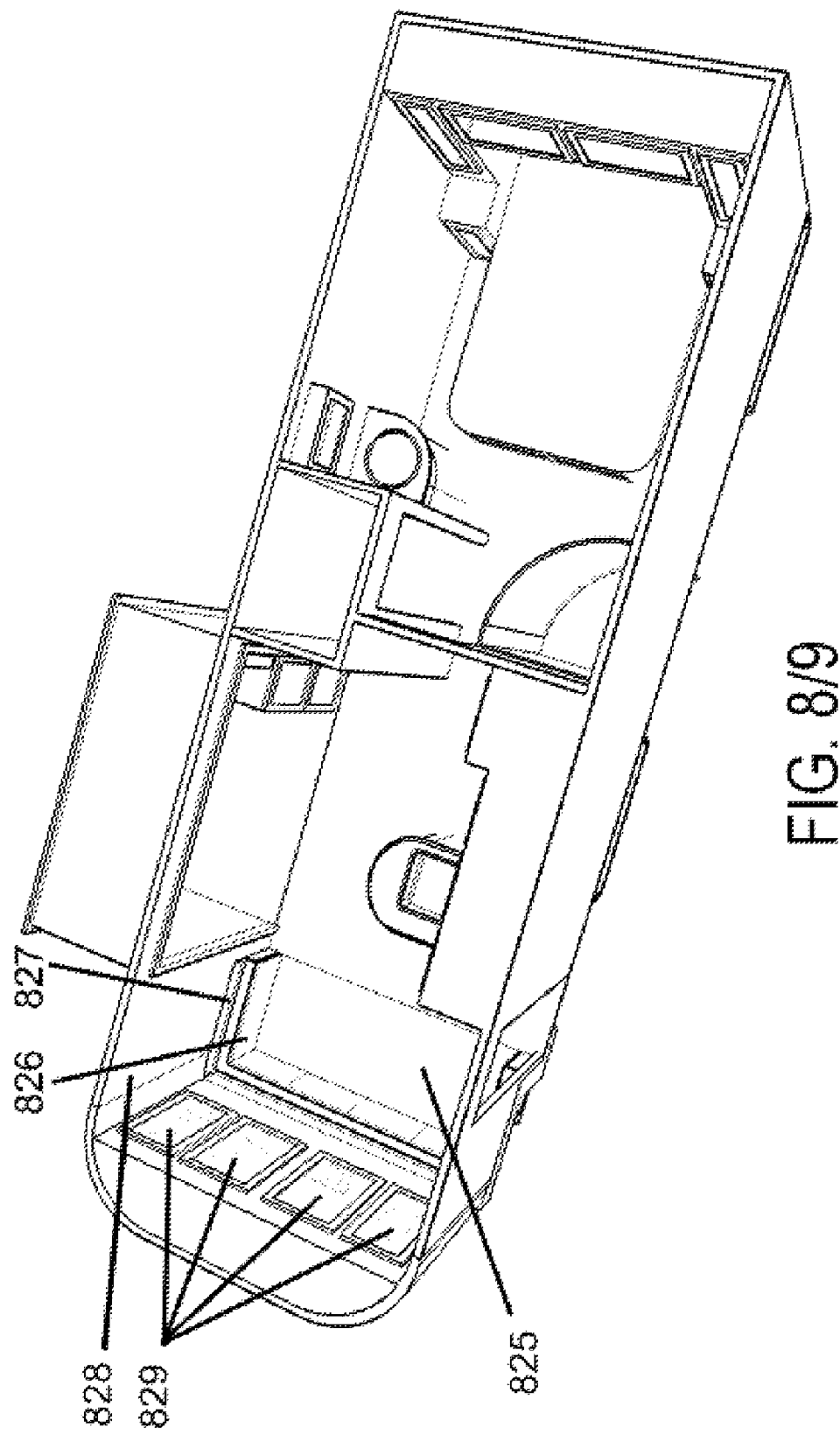

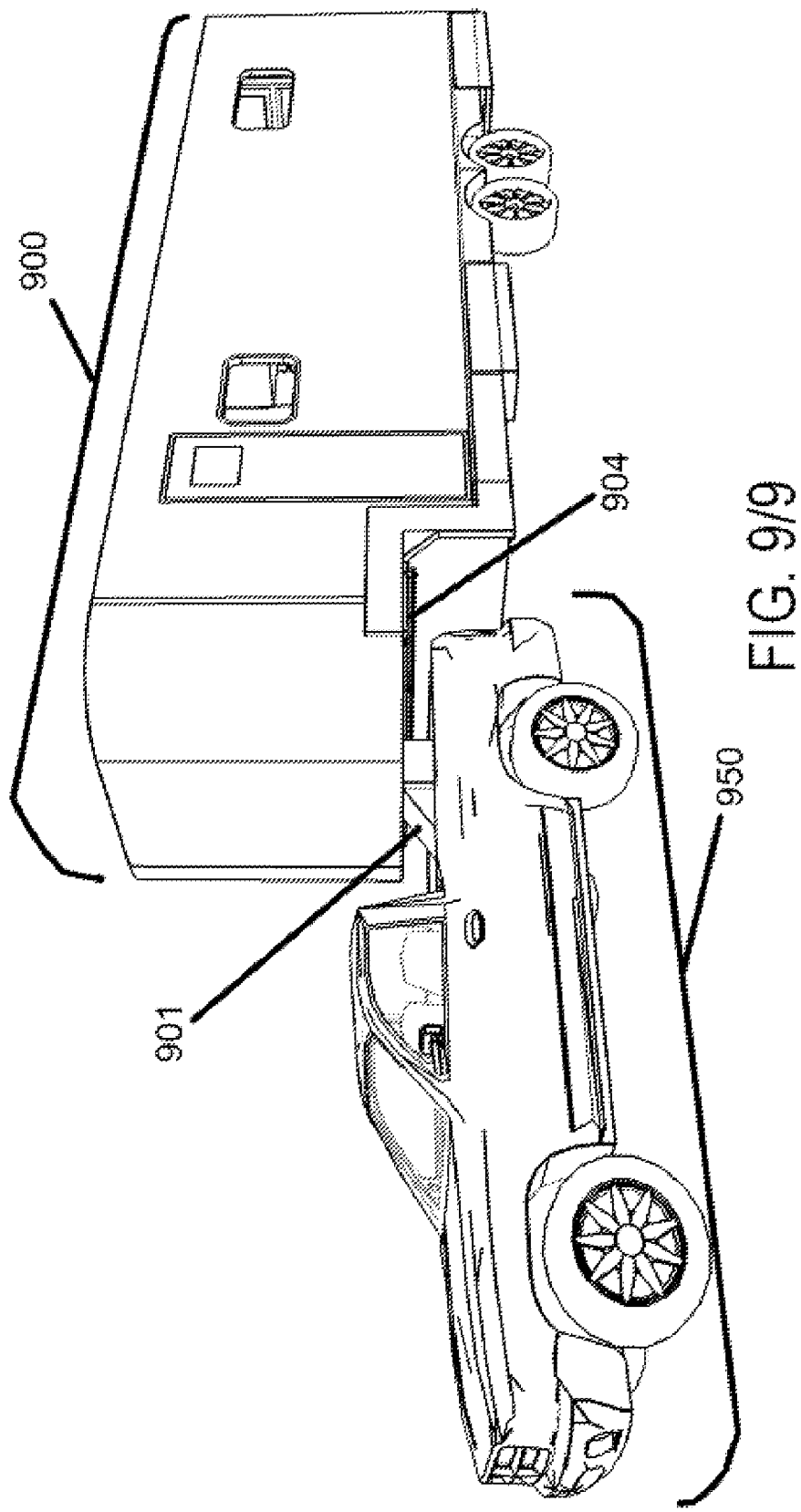
FIG. 9/9

FIFTH-WHEEL TRAILER WITH AN ADJUSTABLE FLOOR AND A METHOD FOR ITS USE

FIELD OF THE INVENTION

The present device is a fifth-wheel trailer having a forward section comprising an adjustable-height floor, which can provide a full-height living space in this forward section when the trailer is parked, but can also allow the trailer to be attached to a towing vehicle using a fifth-wheel hitch to be transported. The present device is easy to use and provides sufficient structural stability and support while being towed as well as when being used as a full-height living space.

BACKGROUND

The present invention relates to trailers that are towed by another vehicle using a fifth-wheel hitch or a gooseneck hitch. Generally, the pin box of the fifth-wheel hitch extends from the bottom of the foremost section of the trailer and attaches to a female receptacle connected to the bed of the towing vehicle, typically over the rear axle of the towing vehicle. The forward sections of nearly all fifth-wheel trailers must extend over the bed of the towing vehicle in order to utilize a fifth-wheel hitching system. Therefore, the lower parts of the forward sections of such fifth-wheel trailers, including the floor, are typically required to be significantly higher than the floors of the remaining, main sections of trailers in order to provide sufficient clearance over the back of the towing vehicle. In common designs of such trailers, the usefulness of this forward section is reduced because it is often not a full-height living space and does not permit users of average height to stand upright comfortably in the space. Additionally, steps must be placed between the main section of the trailer and the raised front section. These steps make use of this area awkward and potentially hazardous.

In an attempt to maximize the usefulness of this space, most current models of fifth-wheel trailers use this forward section of the trailer as a bedroom. In some designs, the roof is made taller over this forward section to make it more comfortable and spacious. These solutions may provide a slightly more comfortable interior space, but they are not optimal by any means. First, the bedroom must be located in this forward section of the vehicle reducing the number of potential floor plan options. Second, this forward section is often not the full height of the rest of trailer, which makes standing in this area impossible or very uncomfortable for a person of average height. Activities that are usually performed in this section can be difficult without the benefit of a full-height space. Third, the floor of the bedroom area is not the same height as the floor of the rest of the trailer, requiring the use of steps to gain entrance to this forward section. Steps are not easily navigated by all people and care is required to deal with the tripping and falling hazard posed by an uneven floor. Finally, some current models elevate the ceiling of the forward section of the trailer to provide greater height to the inside living space. However, by extending the roof of the vehicle upward, the trailer becomes less aerodynamic and more strain is placed on the hitch and towing vehicle, resulting in instability, reduced gas mileage and reduced life of the vehicles and hitching mechanism. Additionally, raising the roof does nothing to alleviate the height difference between the floor of the forward section of the trailer and the floor of the main section of the trailer. In other words, steps are still required even after the roof has been raised.

A few attempts have been made to provide a fifth-wheel trailer that has a full-height forward section. However, these have not been safe or practical and have not been accepted by the market. The pin box for hitching the trailer to the towing vehicle has been attached to a movable structure, such as a wall panel that is hinged into place and acts as one of the walls for the lower section when the floor is lowered. See U.S. Pat. No. 4,085,959. This placement of the metal pin box on a movable piece is not desirable because the structure supporting it is not substantial enough to allow for safe towing. A wall panel cannot provide the necessary structure needed to resist the forces exerted on the trailer while it is being moved and will damage or destroy the panel. Additionally, the pin box must be made of metal or other heavy material. Placing a large heavy object on a part of the trailer that can easily become loose and rotate about a hinge is dangerous and could cause extensive damage to the trailer or tow vehicle and possibly cause serious injury to operators or bystanders. These problems would only be further exacerbated by today's larger and heavier trailers.

What is needed is a trailer having an adjustable-height floor in its forward section that is capable of being towed using a fifth-wheel hitch and can provide a full-height living space when not hitched to a towing vehicle. The main support frame of the trailer must have a shape, which can allow up and down movement of the floor of the front section of the trailer, but also be capable of supporting the weight of the trailer and its contents. The front section's adjustable floor should also be safe and easy to operate.

SUMMARY OF THE INVENTION

It is an aspect of the present device to provide a trailer comprising an adjustable-height floor in its forward section that allows for towing through the use of a fifth-wheel hitch and can still provide a full-height living space when not being towed, with the adjustable-height floor being safe and easy to operate.

The above aspect can be obtained by a trailer capable of being towed using a fifth-wheel hitch comprising: a forward section of the trailer comprising an adjustable forward section floor; a main section of the trailer connected to the forward section, the main section comprising a fixed main section floor; and an adjustable floor assembly connected to the forward section floor configured to adjust a height of the adjustable forward section floor to an raised position relative to the main section floor to allow a towing vehicle to operate below the adjustable floor assembly and to a lowered position which is approximately level with the main section floor.

The above aspect can also be obtained by a trailer capable of being towed using a fifth-wheel hitch comprising: a main frame; the main frame supporting a forward section of the trailer comprising a nonmoving upper forward section and an adjustable forward section floor; the main frame also supporting a main section of the trailer connected to the nonmoving upper forward section, the main section comprising a fixed main section floor; an adjustable floor assembly connected to the forward section floor configured to adjust a height of the adjustable forward section floor to an raised position relative to the main section floor to allow a towing vehicle to operate below the adjustable floor assembly and to a lowered position which is approximately level with the main section floor; and the main frame comprising an opening through which the adjustable floor assembly can move between its raised and lowered positions.

The above aspect can also be obtained by a method for using a trailer capable of being towed using a fifth-wheel hitch: providing a forward section of the trailer comprising an adjustable forward section floor; a main section of the trailer connected to the forward section, the main section comprising a fixed main section floor; an adjustable floor assembly connected to the forward section floor configured to adjust a height of the adjustable forward section floor to an raised position relative to the main section floor to allow a towing vehicle to operate below the adjustable floor assembly and to a lowered position which is approximately level with the main section floor; driving the trailer by a user; stopping the trailer; and lowering, by the user, the adjustable forward section floor.

THE BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which:

FIG. 1/9 is a side perspective view of the main frame of the present trailer further comprising the frame of the adjustable floor assembly with the adjustable floor in its lowered position according to an embodiment;

FIG. 2A/9 is a close-up perspective view from below and in front of the main frame of the forward section of present trailer, wherein the adjustable floor assembly is in its lowered position according to an embodiment;

FIG. 2B/9 is an exploded view of the threaded lift shaft assembly, according to an embodiment;

FIG. 3/9 is a perspective view from behind the forward section of the present trailer showing the frame of the adjustable floor assembly in its lowered position according to an embodiment;

FIG. 4/9 is a perspective view of the frame of an adjustable floor assembly according to an embodiment;

FIG. 5/9 is a perspective view from below the side and front of a present trailer frame with the adjustable floor assembly in its raised position according to an embodiment;

FIG. 6/9 is a perspective view from behind the forward section of the present trailer showing the frame of the adjustable floor assembly in its raised position according to an embodiment;

FIG. 7/9 is a perspective view from the front and side of the present trailer with the adjustable floor assembly in its lowered position according to an embodiment;

FIG. 8/9 is a perspective top cutaway view of a present trailer, furnished and having the adjustable floor assembly in its lowered position according to an embodiment; and FIG. 9/9 is a side perspective view of a towing vehicle connected to present trailer with the adjustable floor assembly in its raised position according to an embodiment.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

The present trailer utilizes a fifth-wheel style hitching mechanism. A full-height forward section can be achieved in these types of trailers through the use of an adjustable-height floor in this forward section. The adjustable-height floor can be supported by and be integrated into the main frame of the trailer, which can provide the strength needed to support the weight of people and furniture when the floor is in a lowered position. The floor of the forward section can be adjusted between two different useful heights. The first height can be a raised position that provides the clearance necessary for the back of the towing vehicle to extend under the forward section of the trailer. The second height can be a lowered position approximately equal to the floor height of the main section of the trailer, allowing the forward section to be a full-height living space when the trailer is not hitched to a towing vehicle. The adjustable floor can be easy to use by an individual and the movement from one height position to another can be accomplished through the use of a switch or button that can control a motor, which can also comprise a safety clutch, capable of lowering or raising the floor at a safe rate of speed.

Many of the negative aspects of the current fifth-wheel trailer designs can be eliminated by having a forward section comprising an adjustable floor. For example, the trailer will no longer require a higher roof in the forward section, in order to maintain a proper ceiling height throughout its interior. This can allow the trailer to be more aerodynamic and stable while being towed, making it less susceptible to both headwinds and crosswinds. The full-height interior allows for different floor plans, because the bedroom no longer needs to be in the forward section. Additionally, furniture can be attached to the adjustable floor so it will not require removal before lifting the front section to its raised height position before the trailer can be hitched to the towing vehicle.

The frame of the adjustable floor assembly can be integrated with the main frame of the trailer itself and can be capable of supporting the weight of the floor, walls and supporting structures, as well as people and furniture placed on the floor. The adjustable floor assembly can connect to the walls and floor of the stationary parts of the trailer with those of the adjustable parts, so that no gaps exist between the walls and floor of the adjustable parts and the stationary parts. Additionally, a fold-down hatch can be used to cover the opening that is created between the forward section and the main section of the trailer when the adjustable floor is in its raised position. The fold-down hatch can be lowered so that it does not interfere with the operation and use of the adjustable floor when placed in its lowered position and can be folded up to cover the opening when the floor is in its raised position. This hatch should not interfere with the use of the trailer when it is disconnected from the towing vehicle and can provide protection to the interior of the trailer when it is being moved. Additionally, seals can be used between all frame surfaces, which comprise the forward section and contact each other, in order to prevent moisture, pests and other undesirable elements from accessing the interior of the trailer. The fold-down hatch and these seals can ensure that the interior of the trailer is protected from the external environment while either being towed or occupied.

The fifth-wheel pin box can be directly connected to the main frame of the trailer, or be an integrated part of the main frame of the trailer ensuring that it is mounted securely enough to withstand all forces exerted on it during towing. Most current fifth-wheel trailer designs place the pin box in this location and the present adjustable floor design trailer design should not add any additional undesirable forces to the pin box that are not found in the current fifth-wheel trailer designs.

Finally, the operation of the adjustable floor can be both safe and simple. The floor can be controlled by a single switch or button and the fold-down hatch can be easy to lift and secure into place. The present trailer can comprise safety mechanisms to ensure that the area beneath the adjustable floor is clear while it being raised or lowered, which can stop any movement of the adjustable floor if a person or object is contacted or otherwise detected. For example, force sensing equipment or motion sensing equipment can be used to ensure that a person or object does not accidentally get pinched, hit or trapped by the movement of the floor.

FIG. 1/9 is a side perspective view of the frame 100 of the present trailer with the frame of the adjustable floor assembly 104 in its lowered position according to an embodiment. The frame of the present trailer 100 can be capable of attaching to a towing vehicle (not pictured) using a fifth-wheel hitching mechanism, which can include a pin box 101 located at the front of the present trailer's frame 100. The pin box 101 can be manufactured as a fully integrated part of the present trailer's frame 100 to provide the necessary support required for safe towing. When not attached to the towing vehicle, the adjustable floor assembly 104 of the forward section 102 of the present trailer frame 100 can be moved into its lowered position, in which the floor comprising the adjustable floor assembly 104 can be located at approximately the same height as the floor of the main section of the trailer 103. In other words, the top surface of the floor comprising the adjustable floor assembly 104 can be approximately level with the top surface of the floor comprising the trailer frame assembly of the main section 103. In one embodiment, a fold-down hatch 105 can be pivotably connected to the frame of the main section 103 of the present trailer with one or more hinges or other suitable pivoting joints (not pictured). When the present trailer is parked and the adjustable floor assembly 104 is deployed into its lowered position, the fold-down hatch 105 can be placed in a down position for storage, as shown in FIG. 1 of 9, which does not interfere with the use of the trailer. The down position for the fold-down hatch 105 can be located below the adjustable floor assembly 104 and be parallel to the ground. When the floor is placed into its lowered position, the entire length of the present trailer's frame can have a continuous and even surface allowing for a full-height living space throughout the trailer.

FIG. 2A/9 is a close-up perspective view from below and in front of the frame of the present trailer, wherein the frame of an adjustable floor assembly 204 is in its lowered position according to an embodiment. The fold-down hatch 205 can be located below the adjustable floor assembly 204 when placed in its lowered position and can be supported by a shelf 206 that extends from the main section of the trailer 203. The shelf 206 can provide support to three of the fold-down hatch's 205 four sides.

The frame of the adjustable floor assembly 204 can extend below the forward section of the present trailer's main frame 202, which itself, is typically elevated to provide clearance for the towing vehicle. Two or more threaded lift shafts 207 and 217 can be used to raise and lower the adjustable floor assembly 204. The threaded lift shafts 207 and 217 can pass through a threaded hole in the forward section of the trailer's main frame 202 to provide connection to the trailer's main frame 202 and movement of the frame of the adjustable floor assembly 204 relative to the trailer's main frame. A lift assembly can comprise a twelve (12) volt electric motor with a safety clutch 208, or any other suitable driving device suitable to power the lifting mechanism. The motor 208 can be attached to the underside of the frame of the adjustable floor assembly 204 through the use of a motor bracket 209. The motor bracket 209 can be secured to the underside of the adjustable floor assembly 204 by bolts 210 or other suitable fastening devices.

The motor 208 can turn a first threaded lift shaft 207, which can comprise a sprocket 211, pulley or similar device. The sprocket 211 can drive a chain 212, belt, or other similar device that can be attached to a second sprocket 213 on a second threaded lift shaft 217 located at the opposite side of the adjustable floor assembly 204. The chain 212, or other similar device, can connect the first lift shaft 207 and the second lift shaft 217 allowing them to turn in unison keeping the floor level as it is raised and lowered. The chain 212 can be kept steady and tight through the use of a chain tensioner 214 or similar device.

The threaded lift shafts 207 and 217 can be held in place through the use of removable side frames 215. The removable side frames 215 can be made of metal or any other suitably strong material, which can be secured to the frame of the adjustable floor assembly 204 through the use of bolts 216 or other fastening devices. Note that the present embodiment comprises a chain-drive, mechanical system; however, the adjustable floor can be moved using a belt-drive system, a hydraulic system, a pneumatic system or any other suitable driving system. Likewise, although the preferred embodiment comprises an automatic, electrically-driven lifting mechanism, a manual mechanism, or combined automatic and manual lifting mechanism could also be employed.

FIG. 2B/9 is an exploded view of the threaded lift shaft assembly, according to an embodiment. The threaded lift shaft assembly can comprise a first threaded lift shaft 207 having two ends 230 and 231. A first end 230 can have a circular cross-section and a second end 231 can comprise two parallel flat sides 232 and two curved sides 233, which can connect to the motor 208 allowing it to turn the first threaded lift shaft 207. The first threaded lift shaft 207 can then be inserted through the motor bracket 209 a sprocket 211 and a sleeve 234. The sprocket 211 can connect to the first threaded lift shaft 207 allowing it to turn in conjunction with a second threaded lift shaft 217, which can be connected by a chain (not pictured) the chain can turn the second threaded lift shaft 217 mounted at the opposite end of the forward section of the trailer. The second threaded lift shaft 217 can be constructed and mounted similarly to the first threaded lift shaft 217, except for the absence of a motor or a motor bracket. The first threaded lift shaft 207 and the second threaded lift shaft 217 can be threaded through the forward section of the trailer frame and secured through the use of a cap 235. Although the preferred embodiment has been shown comprising two threaded lift shafts, any number could be similarly employed to raise and lower the adjustable floor.

FIG. 3/9 is a perspective view from behind the forward section of the present trailer showing the frame of the adjustable floor assembly 304 in the lowered position according to an embodiment. The top of the frame of the adjustable floor assembly 304 can form part of a three-sided box. A first side 321 of the three-sided box can be connected perpendicularly to the floor 325 of the adjustable floor assembly 304. A second side 322 of the three-sided box can be connected perpendicularly to both the floor 325 and the first side 321 of the adjustable floor assembly 304. A third side 323 of the three-sided box can be connected perpendicularly to both the floor 325 and the second side 322 of the adjustable floor assembly 304. The top of this three-sided box can extend beyond the frame portion below it forming a ledge 317. This ledge 317 can provide support for the adjustable floor when it is in the lowered position by resting against a lip, which is not pictured in FIG. 3/9, comprising the forward section of the present trailer 302. This ledge and lip support system can be sufficient to safely support the weight of the adjustable floor assembly 304 as well as any typical loads placed upon the forward section by occupants and furniture while it is being used as a living area. Although the shape of the adjustable floor assembly is shown as a rectangle in FIG. 3/9, it can be semi-circular or any other shape that is suitable for a particular trailer or design.

FIG. 4/9 is a perspective view of the frame of an adjustable floor assembly 404 according to an embodiment. When the adjustable floor is in either its raised or lowered position the joints where connection is made between the adjustable floor assembly 404 and the main trailer frame must be sealed in order to keep pests and moisture from entering the interior of the trailer. This weather tight junction can be achieved through the use of compression seals 419 mounted along these joints. These compression seals 419 can be attached to the top of the removable side frames 415 and across the top of the front piece 420 of the lower portion of the adjustable floor frame assembly 404 to seal it when placed in the raised position for towing. The compression seals can also be located on the underside of the top bar 418 of the adjustable floor frame assembly 404, forming the ledge 317 described above. This compression seal or set of compression seals can provide a weather tight seal for the joint between the adjustable floor frame assembly 404 and the main trailer frame, when the adjustable floor assembly is placed in its lowered position.

FIG. 5/9 is a perspective view from below the side and front of a present trailer frame with the adjustable floor assembly 504 in its raised position according to an embodiment. Prior to attaching the trailer to a towing vehicle, a switch or other control mechanism (not pictured) can activate the motor 508, which can simultaneously turn the two threaded lift shafts 507 and 517. The threaded lift shafts 507 and 517 are movably attached to the main frame of the forward section of the trailer 502 and as they rotate, the adjustable floor assembly 504 is either raised or lowered depending on the direction they are turned. Once the floor is placed into its raised position, the fold-down hatch 505 can be folded up into place covering the opening into the trailer's interior that is created when the adjustable floor assembly is lifted into its raised position. The hatch 505 can be rotated into the upright position through the use of hinges (not pictured) and secured by a locking latch (not pictured) or other suitable securing device.

FIG. 6/9 is a perspective view from behind the forward section of the present trailer showing the frame of the adjustable floor assembly 604 in its raised position according to an embodiment. When the adjustable floor assembly 604 is placed in this raised position, the fold-down hatch 605 can be placed in its up position covering the opening created at the front of the trailer's main section 603. Additional shielding pieces 621 comprising the forward section of the trailer 602 can extend inward to block any additional opening that may exist between the edges of the frames and the fold-down hatch 605 when the floor is in either its raised or lowered position. When placed in the raised position, the bottom of the adjustable floor assembly 604 can be approximately level with, or above the lowest part of the non-moving part of the forward section of the main trailer frame 602. This position can allow sufficient clearance to exist between the trailer and the towing vehicle. The top of the frame of the adjustable floor assembly 604 can form a ledge 622, which can rest upon a lip 623 when the adjustable floor assembly 604 is in its lowered position, which can be connected to or be part of the forward section of the main trailer frame 602.

FIG. 7/9 is a perspective view from the front and side of the present trailer with the adjustable floor assembly 704 in its lowered position according to an embodiment. In this view it can be seen that the adjustable floor assembly 704 can move up and down through a opening in the forward section of the main trailer frame 700. Both the forward section of the main trailer frame 700 and the frame of the adjustable floor assembly 704 can be covered by sheet metal, fiberglass, plastic, or any other suitable covering material. This material 724 can be connected to both the main trailer frame 704 and the frame of the adjustable floor assembly 704 as well as the walls and roof of the trailer.

FIG. 8/9 is a perspective top cutaway view of a present trailer, furnished and having the adjustable floor assembly in the lowered position according to an embodiment. The adjustable floor assembly can be covered with carpeting, linoleum or other suitable floor 825 materials and the walls 826 can be covered with suitable wall materials so that the trailer can have a uniform appearance throughout its interior. The material comprising the floor 825 of the adjustable floor assembly can extend slightly past the adjustable floor frame and onto the top of the recreational vehicle frame to cover the joint between the two frames. Likewise, a small piece 827 of the walls comprising the adjustable floor assembly can protrude into the interior of the non-moving section of the trailer and the adjacent walls 828 of the non-moving part of the forward section of the trailer. This small piece 827 can be integrated with furniture or other living features so that it is not hazardous or unsightly. Cupboards 829 or other aesthetic features can be positioned in the walls of the upper portion of the living area above the adjustable floor. The operation of the adjustable floor can be designed so as to avoid disturbing these aesthetic features.

FIG. 9/9 is a side perspective view of a towing vehicle 950 connected to present trailer 900 with the adjustable floor assembly 904 in its raised position according to an embodiment. With the adjustable floor assembly 904 in the raised position, the rear of the towing vehicle 950 can easily move below the forward section of the present trailer 900 while the pinbox 901 is hitched to the towing vehicle 950.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A trailer capable of being towed using a fifth-wheel hitch system comprising:
    a forward section of the trailer comprising an adjustable forward section floor;
    a main section of the trailer connected to the forward section, the main section comprising a fixed main section floor; and
    an adjustable floor assembly connected to the forward section floor configured to adjust a height of the adjustable forward section floor to a raised position relative to the main section floor to allow a towing vehicle to operate below the adjustable floor assembly and to a lowered position which is approximately level with the main section floor.

2. A trailer as described in claim 1, wherein the adjustable floor assembly is further configured to be actuated by one or more electric motors rotating one or more threaded lift shafts.

3. A trailer as described in claim 2, wherein the electric motor further comprises a safety clutch.

4. A trailer as described in claim 1, further comprising one or more sensors to detect obstacles located above or below the adjustable floor assembly.

5. A trailer as described in claim 4, wherein the sensors detect motion.

6. A trailer as described in claim 1, wherein the adjustable floor assembly is further configured to be actuated by one or more hydraulic motors rotating one or more threaded lift shafts.

7. A trailer as described in claim 1, wherein the adjustable floor assembly is further configured to be actuated by one or more pneumatic motors rotating one or more threaded lift shafts.

8. A trailer as described in claim 1, wherein the adjustable floor assembly is further configured to be actuated by one or more hydraulic cylinders.

9. A trailer as described in claim 1, wherein the adjustable floor assembly is further configured to be actuated by manually rotating one or more threaded lift shafts.

10. A trailer as described in claim 1, wherein the adjustable floor assembly further comprises one or more walls.

11. A trailer as described in claim 1, wherein the adjustable floor assembly is rectangular in shape.

12. A trailer as described in claim 4, wherein the one or more sensors detects force.

13. A trailer as described in claim 1, further comprising a main frame capable of supporting the forward section and the main section.

14. A trailer as described in claim 13, wherein the main frame also comprises a pinbox and towing hitch.

15. A trailer as described in claim 13, wherein the adjustable floor assembly is moveable between its raised and lowered positions through an opening in the main frame.

16. A trailer as described in claim 1, further comprising a hatch to seal an opening into the interior of the trailer created when the adjustable floor assembly is in its raised position.

17. A trailer as described in claim 16, wherein the hatch is a fold-down hatch pivotably connected to the trailer.

18. A trailer capable of being towed using a fifth-wheel hitch comprising:
a main frame;
the main frame supporting a forward section of the trailer comprising a nonmoving upper forward section and an adjustable forward section floor;
the main frame also supporting a main section of the trailer connected to the nonmoving upper forward section, the main section comprising a fixed main section floor;
an adjustable floor assembly connected to the forward section floor configured to adjust a height of the adjustable forward section floor to a raised position relative to the main section floor to allow a towing vehicle to operate below the adjustable forward section floor and to a lowered position which is approximately level with the main section floor; and
the main frame comprising an opening through which the adjustable floor assembly is configured to move the forward section floor between its raised and lowered positions.

19. A trailer as described in claim 18, wherein the nonmoving upper forward section comprises a lip and the adjustable floor assembly comprises a ledge capable of being supported by the lip.

20. A method for using a trailer capable of being towed using a fifth-wheel hitch:
providing a trailer comprising:
a forward section of the trailer comprising an adjustable forward section floor;
a main section of the trailer connected to the forward section, the main section comprising a fixed main section floor;
an adjustable floor assembly connected to the forward section floor configured to adjust a height of the adjustable forward section floor to a raised position relative to the main section floor to allow a towing vehicle to operate below the adjustable floor assembly and to a lowered position which is approximately level with the main section floor;
transporting the trailer by a user using a towing vehicle in the raised position relative to the main section floor;
parking the trailer and detaching it from the towing vehicle; and
lowering, by the user, the adjustable forward section floor to the lowered position which is approximately level with the main section floor.

\* \* \* \* \*